United States Patent
Wu

(10) Patent No.: US 8,526,617 B2
(45) Date of Patent: Sep. 3, 2013

(54) METHOD OF HANDLING SECURITY CONFIGURATION IN WIRELESS COMMUNICATIONS SYSTEM AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 663 days.

(21) Appl. No.: 12/558,605

(22) Filed: Sep. 14, 2009

(65) Prior Publication Data

US 2010/0166184 A1  Jul. 1, 2010

Related U.S. Application Data

(60) Provisional application No. 61/140,987, filed on Dec. 29, 2008.

(51) Int. Cl.
*H04K 1/00* (2006.01)

(52) U.S. Cl.
USPC ............ 380/270; 380/44; 380/277; 380/278; 455/436; 455/439; 455/442

(58) Field of Classification Search
USPC ................ 380/270, 44, 277, 278; 455/410, 455/436, 439, 442
See application file for complete search history.

(56) References Cited

U.S. PATENT DOCUMENTS

| 8,311,512 B2 * | 11/2012 | Kitazoe et al. | 455/410 |
|---|---|---|---|
| 2005/0176431 A1 * | 8/2005 | Herrero Veron | 455/436 |
| 2005/0208972 A1 * | 9/2005 | Vainola et al. | 455/560 |
| 2008/0170702 A1 * | 7/2008 | Li et al. | 380/283 |
| 2008/0318546 A1 * | 12/2008 | Kitazoe et al. | 455/410 |
| 2011/0092213 A1 * | 4/2011 | Forsberg et al. | 455/436 |
| 2011/0201337 A1 * | 8/2011 | Forsberg et al. | 455/436 |

FOREIGN PATENT DOCUMENTS

| TW | 200415901 | 8/2004 |
|---|---|---|
| TW | 200541289 | 12/2005 |

OTHER PUBLICATIONS

"3rd Generation Partnership Project; Technical Specification Group Services and System Aspects; 3GPP System Architecture Evolution (SAE): Security Architecture; (Release 8)," 3GPP TS 33.401 V8.2.1 (Dec. 2008), pp. 1-58, XP002574135, France.

"Universal Mobile Telecommunications System (UMTS); 3G security; Security architecture (3GPP TS 33.102 version 5.3.0 Release 5)," ETSI TS 133 102 V5.3.0, Sep. 2003, pp. 1-62, XP014017590, ETSI Standards, France, ISSN: 0000-0001.

3GPP Ts 36.331 V8.4.0 Evolved Universal Terrestrial Radio Access (E-UTRA) Radio Resource Control (RRC), Dec. 2008.

3GPP TS 33.401 V8.2.0 3GPP System Architecture Evolution (SAE) Security Architecture, Dec. 2008.

Office action mailed on Nov. 28, 2012 for the Taiwan application No. 098142854, filed Dec. 15, 2009, p. 1-8.

* cited by examiner

*Primary Examiner* — Carl Colin
*Assistant Examiner* — Mohammad A Siddiqi
(74) *Attorney, Agent, or Firm* — Winston Hsu; Scott Margo

(57) ABSTRACT

A method of handling security configuration for a mobile device using a mapped security context in a wireless communication system includes utilizing the mapped security context to derive ciphering and integrity keys when security configuration, indicating a key update based on a cached security context, is received.

6 Claims, 6 Drawing Sheets

METHOD OF HANDLING SECURITY CONFIGURATION IN WIRELESS COMMUNICATIONS SYSTEM AND RELATED COMMUNICATION DEVICE

CROSS REFERENCE TO RELATED APPLICATIONS

This application claims the benefit of U.S. Provisional Application No. 61/140,987, filed on Dec. 29, 2008 and entitled "METHOD OF HANDLING SECURITY CONFIGURATION IN WIRELESS COMMUNICATIONS SYSTEM AND RELATED COMMUNICATION" the contents of which are incorporated herein.

BACKGROUND OF THE INVENTION

1. Field of the Invention

The present invention relates to a method utilized in a wireless communication and communication device thereof, and more particularly, to a method of handling security configuration in a wireless communication system and communication device thereof.

2. Description of the Prior Art

In a mobile communication system, information security technologies are employed to protect signalling and user plane messages from eavesdropping and malicious modification. The information security is typically achieved by using encryption and integrity protection mechanisms, which rely on various keys, counters, etc. In an EPS (Evolved Packet Subsystem) system including a long term evolution (LTE) radio access system and a EPC (Evolved Packet Core) system, a user equipment (UE) maintains security context, including keys, ciphering/integrity protection algorithms, key derivation functions, etc, for realizing UP (User Plane), NAS (Non Access Stratum) and AS (Access Stratum) protection.

For security continuity on intra/inter-system mobility, e.g. a handover or connection re-establishment, two types of security contexts are defined: Cached security context and Mapped security context. The cached security context is created for a given system during prior access. For example, an authentication and key agreement (AKA) procedure over an E-UTRAN (Evolved UMTS Terrestrial Radio Access Network) is used to generate an intermediate key $K_{ASME}$ which is shared between the UE and an access security management entity, i.e. a MME (Mobility Management Entity), based on a permanent key K and EPS ciphering/integrity keys (CK/IK). The $K_{ASME}$ is associated with the cached security context of the LTE system.

In contrast, the mapped security context is created by converting the currently-used security context for a target system in inter-system mobility. For example, a UE performing a handover from a UMTS to the LTE system creates mapped security context by deriving EPS keys from UMTS keys. More specifically, an intermediate key $K'_{ASME}$, associated with the mapped security context, is derived from CK/IK derived from a UMTS AKA procedure with the help of a one-way key derivation function.

In an intra-LTE handover following a handover to E-UTRAN, a keyChangeIndicator information element (IE) in a RRCConnectionReconfiguration message is utilized to indicate whether the UE should use the keys associated with the latest available intermediate key $K_{ASME}$. If the key-ChangeIndicator IE is set to 'TRUE', the UE updates a $K_{eNB}$ key (base-station-level key) based on the latest available $K_{ASME}$ key, or else the UE updates the $K_{eNB}$ key based on the intermediate $K_{ASME}$ key to which the current $K_{eNB}$ is associated. Thus, the UE always updates the $K_{eNB}$ key based on the cached security context ($K_{ASME}$) in the intra-LTE handover procedure for the AS and NAS transmission protection. In addition, the UE has to update the $K_{eNB}$ key based on the $K_{ASME}$ key to which the current $K_{eNB}$ is associated when receiving the RRCConnectionReconfiguration message.

In a RRC (Radio Resource Control) connection re-establishment procedure (e.g. triggered by a radio link failure) following a handover to E-UTRAN, a keyChangeIndicator information element (IE) in a RRCConnectionReestablishment message is utilized to indicate whether the UE should use the keys associated with the latest available intermediate key $K_{ASME}$. If the keyChangeIndicator IE is set to 'TRUE', the UE updates a $K_{eNB}$ key (base-station-level key) based on the latest available $K_{ASME}$ key, or else the UE updates the $K_{eNB}$ key based on the intermediate $K_{ASME}$ key to which the current $K_{eNB}$ is associated. Thus, the UE always updates the $K_{eNB}$ key based on the cached security context ($K_{ASME}$) in the RRC connection re-establishment procedure for the AS and NAS transmission protection. In addition, the UE has to update the $K_{eNB}$ key based on the $K_{ASME}$ key to which the current $K_{eNB}$ is associated when receiving the RRCConnectionReestablishment message.

On the other hand, the MME, for a successful handover from the UTRAN to E-UTRAN, derives the intermediate key $K'_{ASME}$ from the CK/IK of the UMTS system with the help of an one-way key derivation function. Then, the MME derives NAS keys and the $K_{eNB}$ from the intermediate key $K'_{ASME}$. In other words, the MME uses the mapped security context to perform NAS message transmission with the UE after the handover.

As can be seen from the above, the UE and MME may apply different types of security context for signaling and data transmission due to the RRC connection re-establishment procedure (e.g. triggered by radio link failure) following an inter-system handover, resulting in data/signaling ciphering/integrity protection errors.

Take a first example. A UE is requested to perform an inter-system handover to an eNB (evolved Node-B) in a E-UTRAN. The UE and MME both derive an intermediate key $K'_{ASME}$ (mapped security context) from CK and IK used in the source system. In addition, the UE also derives a key $K_{eNB}$ from the intermediate key $K'_{ASME}$ and uses the key $K_{eNB}$ to derive ciphering and integrity keys, such as $K_{UPenc}$, $K_{RRCint}$ and $K_{RRCenc}$, for security activation. As a result, the derived $K_{eNB}$ is associated to the $K'_{ASME}$ key. In addition, the UE has cached EPS security context including intermediate key $K_{ASME}$. After the inter-system handover, the eNB requests the UE to perform an intra LTE handover to a target eNB. During the intra LTE handover, the MME uses the intermediate key $K'_{ASME}$ to derive the $K_{eNB}$ and sends the $K_{eNB}$ to the target eNB. In addition, in the intra-LTE handover, the corresponding keyChangeIndicator IE is set to 'FALSE'. According to the prior art, the UE has to use an intermediate key $K_{ASME}$ to which the current $K_{eNB}$ is associated, for updating the $K_{eNB}$ key. However, the $K_{ASME}$ to which the current $K_{eNB}$ is associated does not exist in the UE because the current $K_{eNB}$ is associated to the intermediate $K'_{ASME}$ key. The UE may use the intermediate $K_{ASME}$ of the cached EPS security context to update the key $K_{eNB}$, causing $K_{eNB}$ content difference between the UE and the target eNB. Different keys $K_{eNB}$ cannot derive the same CK and IK. As a result, the UE and the target eNB use different ciphering and integrity keys for signaling and data transmission, resulting in transmission failure after the intra-LTE handover.

Take a second example. A UE is requested to perform an inter-system handover to an eNB (evolved Node-B) in a E-UTRAN. The UE and MME both derive an intermediate key $K'_{ASME}$ (mapped security context) from CK and IK used in the source system. In addition, the UE also derives a key $K_{eNB}$ from the intermediate key $K'_{ASME}$ and uses the key $K_{eNB}$ to derive ciphering and integrity keys, such as $K_{UPenc}$, $K_{RRCint}$ and $K_{RRCenc}$, for security activation. In addition, the UE has cached EPS security context including intermediate key $K_{ASME}$. The inter-system handover command can include the keyChangeIndicator IE. How to interpret the keyChangeIndicator IE for the inter-system handover is not specified for the UE. If the UE interprets the keyChangeIndicator IE as the intra-LTE handover case, the UE encounters the same problem described in the above example.

Take a third example. A UE is requested to perform an inter-system handover to an eNB in a E-UTRAN. The UE and MME both derive an intermediate key $K'_{ASME}$ (mapped security context) from CK and IK used in the source system. In addition, the UE also derives a key $K_{eNB}$ from the intermediate key $K'_{ASME}$ and uses the key $K_{eNB}$ to derive ciphering and integrity keys, such as $K_{UPenc}$, $K_{RRCint}$ and $K_{RRCenc}$, for security activation. As a result, the derived $K_{eNB}$ is associated to the intermediate key $K'_{ASME}$. In addition, the UE has cached EPS security context including intermediate key $K_{ASME}$. The UE performs a RRC connection re-establishment procedure to a target eNB due to radio link failure. According to the prior art, the UE uses the $K_{ASME}$ to which the current $K_{eNB}$ is associated when receiving a RRCConnectionReestablishment message. However, the current intermediate key $K_{ASME}$ is not associated to the current $K_{eNB}$ that is associated to the intermediate key $K'_{ASME}$. The UE possibly uses the intermediate key $K_{ASME}$ of the cached EPS security context to update the key $K_{eNB}$. However, the MME has used the intermediate key $K'_{ASME}$ to derive the key $K_{eNB}$ and sends the $K_{eNB}$ to the target eNB during the RRC connection re-establishment procedure. As a result, the UE ciphering keys and integrity keys are different from eNB ciphering keys and integrity keys, resulting in failure of the RRC connection re-establishment procedure.

Furthermore, an integrityProtAlgorithm IE used to indicate an algorithm for integrity protection of the SRBs (Signaling Radio Bearer) is an optional IE. The cipheringAlgorithm IE used to indicate an algorithm for ciphering the SRBs and DRBs (Data Radio Bearers) is also an optional IE. The prior art does not specify how to handle a case that the integrityProtAlgorithm or cipheringAlgorithm IE is missed (not included) in a received message, such as a securityConfiguration message. Without this, the UE and the network may use different algorithms to derive corresponding keys, thereby causing data/signaling ciphering/integrity protection errors.

SUMMARY OF THE INVENTION

Therefore, the present invention provides a method for handling security configuration in a wireless communication system and related communication device to avoid the above-mentioned problems.

According to one aspect of the present invention, a method of handling security configuration for a mobile device using a mapped security context in a wireless communication system includes utilizing the mapped security context to derive ciphering and integrity keys when security configuration, indicating a key update based on a cached security context, is received.

According to another aspect of the present invention, a method of handling security configuration for a mobile device in a wireless communication system includes receiving security configuration associated with a key update based on a cashed security context via an inter-system handover, and determining whether to utilize the cashed security context to derive ciphering and integrity keys according to the security configuration.

According to another aspect of the present invention, a method of handling security configuration for a mobile device in a wireless communication system includes determining whether to utilize a currently-used security algorithm associated with a security function to derive at least a security key according to a received handover when the received handover command does not include any security algorithm assigning configuration associated with the security function.

According to another aspect of the present invention, a communication device of a wireless communication system for accurately handling security configuration includes a computer readable recording medium and a processor. The computer readable recording medium is used for storing mapped security context, cached security context, and program code corresponding to a process. The processor is coupled to the computer readable recording medium and used for processing the program code to execute the process. The process includes utilizing the mapped security context to derive ciphering and integrity keys when the mapped security context is in use and security configuration, indicating a key update based on the cached security context, is received.

According to another aspect of the present invention, a communication device of a wireless communication system for accurately handling security configuration, the communication device includes a computer readable recording medium and a processor. The computer readable recording medium is used for storing cached security context and program code corresponding to a process. The processor is coupled to the computer readable recording medium and used for processing the program code to execute the process. The process includes receiving security configuration associated with a key update based on the cashed security context via an inter-system handover, and determining whether to utilize the cashed security context to derive ciphering and integrity keys according to the security configuration.

According to another aspect of the present invention, a communication device of a wireless communication system for accurately handling security configuration includes a computer readable recording medium and a processor. The computer readable recording medium is used for storing program code corresponding to a process. The processor is coupled to the computer readable recording medium and used for processing the program code to execute the process. The process includes determining whether to utilize a currently-used security algorithm associated with a security function to derive at least a security key according to a received handover when the received handover command does not include any security algorithm assigning configuration associated with the security function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
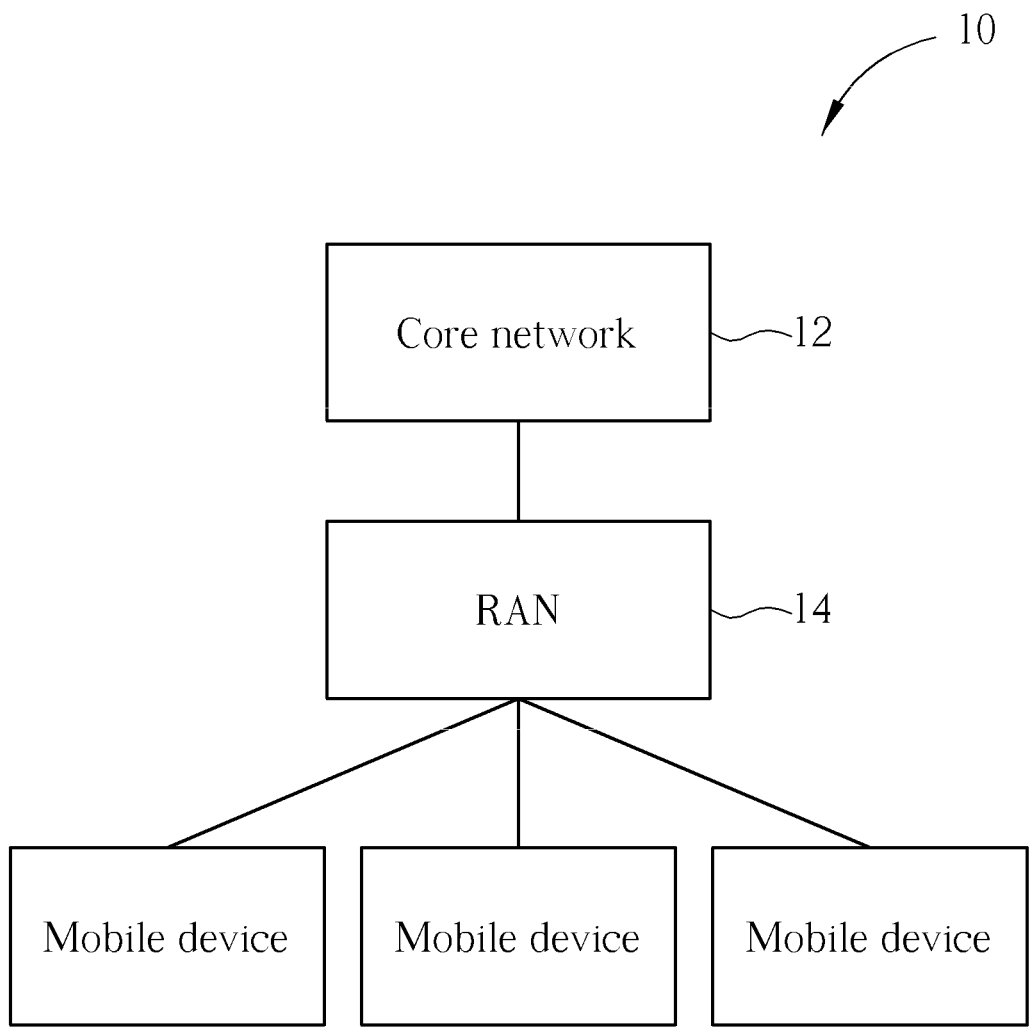
FIG. 1 is a schematic diagram of a wireless communication system.

Please refer to FIG. 1, which illustrates a schematic diagram of a wireless communication system 10. Briefly, the wireless communication system 10 includes a core network 12, a radio access network (RAN) 14 and a plurality of mobile devices. The RAN 14 can be a second generation (2G) network, e.g. a GERAN (GSM/EDEG Radio Access Network), or a third generation (3G) network other than an evolved 3G network, e.g. UTRAN (UMTS Terrestrial Radio Access Network) and includes a plurality of base stations, such as Node-Bs or evolved Node-Bs (eNBs). The mobile devices can be referred as user equipments (UEs) or mobile stations (MSs), and can support multi-radio-access technologies (RATs) including the GSM/UMTS/LTE (Long Term Evolution). The mobile devices can be devices such as mobile phones, computer systems, etc.

In FIG. 1, the mobile devices communicate with the core network 12 via the RAN 14. Transmission security between the mobile device and the core network 12 or between the mobile device and the RAN 14 relies on multiple security keys. Same keys and same algorithms are used in both sides to ensure that the transmission data/signaling is safe. If different keys are used in both sides, the security function is failed. The mobile device may enter the RAN 14 from a source RAN via an inter-system handover. In this situation, the mobile device generates mapped security context for the RAN 14 based on the security context used in the source RAN. Similarly, the mobile device may leave the RAN 14 for a target RAN also via an inter-system handover. In this situation, the mobile device generates mapped security context for the target system based on the security context used in the RAN 14. In addition, the mobile device, the core network 12, and the RAN 14 can jointly perform a key renewing procedure, such as an AKA (Authentication and Key Agreement) procedure, so as to generate cached security context. An intra-system handover can be initiated to change a serving base station of the mobile device.

Figure 2:
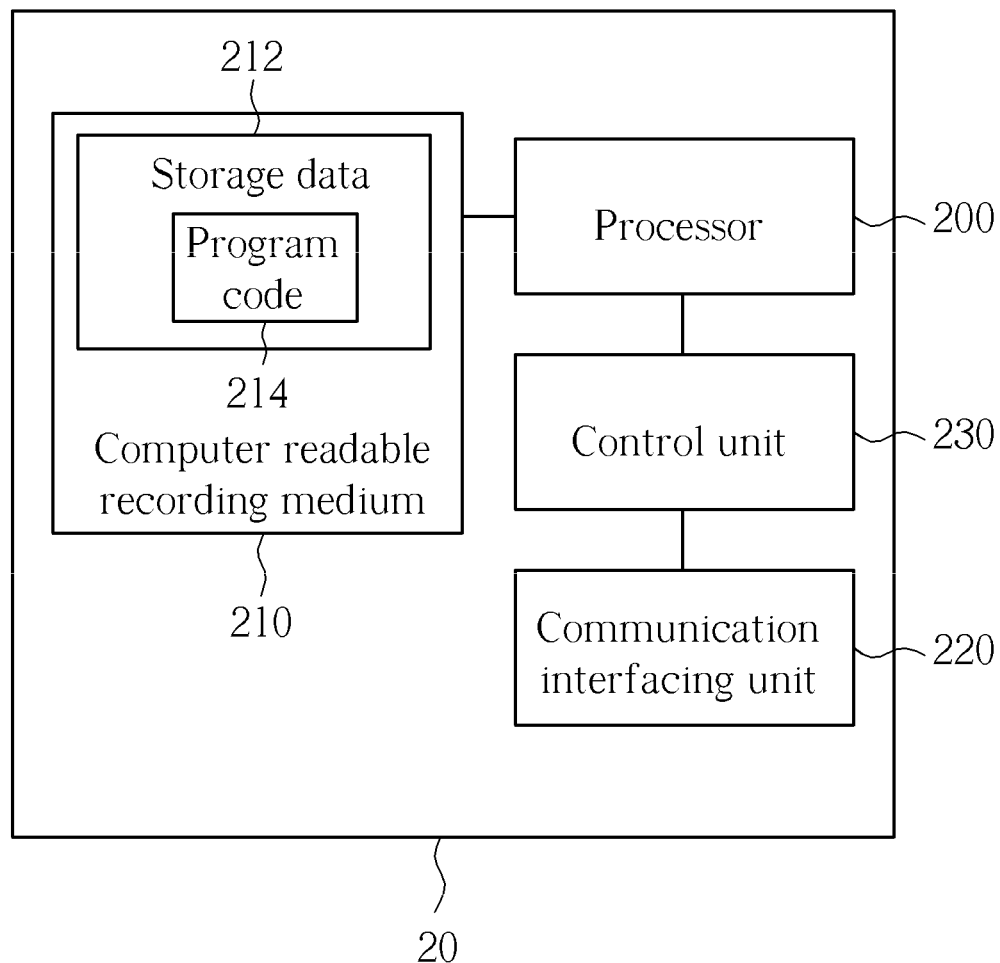
FIG. 2 is a schematic diagram of a communication device according to an embodiment of the present invention.

Please refer to FIG. 2, which illustrates a schematic diagram of a communication device 20 according to an embodiment of the present invention. The communication device 20 can be the mobile devices shown in FIG. 1 and includes a processor 200, a computer readable recording medium 210, a communication interfacing unit 220 and a control unit 230. The computer readable recording medium 210 is any data storage device that includes program code 214, thereafter read and processed by the processor 200. The computer readable recording medium 210 can include any of a subscriber identity module (SIM), a universal subscriber identity module (USIM), read-only memory (ROM), random-access memory (RAM), CD-ROMs, magnetic tapes, hard disks, optical data storage devices, and carrier waves (such as data transmission through the Internet). The control unit 230 controls the communication interfacing unit 220 and related operations and states of the communication device 20 according to processing results of the processor 200. The communication interfacing unit 220 is preferably a radio transceiver and accordingly exchanges wireless signals with the network.

Preferably, the communication device 20 supports the LTE, UMTS, GSM, and GERAN lu mode systems. Some of security key configuration of the communication device 20 include:

Security key configuration for the LTE system (EUTRAN) including an eKSI (evolved Key Set Identifier), a $K_{ASME}$ (a mobile-management-level key used between the UE and a mobile management entity (MME) of a core network, associated with the cached security context), and a $K'_{ASME}$ (a mobile-management-level key used between the UE and a mobile management entity, associated with the mapped security context), a key $K_{eNB}$ (a base-station-level key used between the UE and a eNB), and a $K_{RRCint}$ (a radio resource control integrity protection key), a $K_{RRCenc}$ (a radio resource control encryption key), and a $K_{UPenc}$ (a user plane encryption key), where the eKSI can be a $KSI_{ASME}$ that is a parameter of the cashed security context associated with the $K_{ASME}$ or be a $KSI_{SGSN}$ that is a parameter of the mapped security context associated with the $K'_{ASME}$;

security key configuration for the UMTS (UTRAN) and GERAN lu mode systems including CK/IK and a KSI, corresponding to a packet or circuited switched domain; and security key configuration of the GERAN system including a GSM ciphering key (kc) for the CS domain and a GPRS (Global Packet Radio Service) ciphering key (kc) for the PS domain.

The abovementioned mapped and cached security contexts and related keys, if existing, can be stored in the computer readable recording medium 210 and read and processed by the processor 200 via the program code 214.

Figure 3:
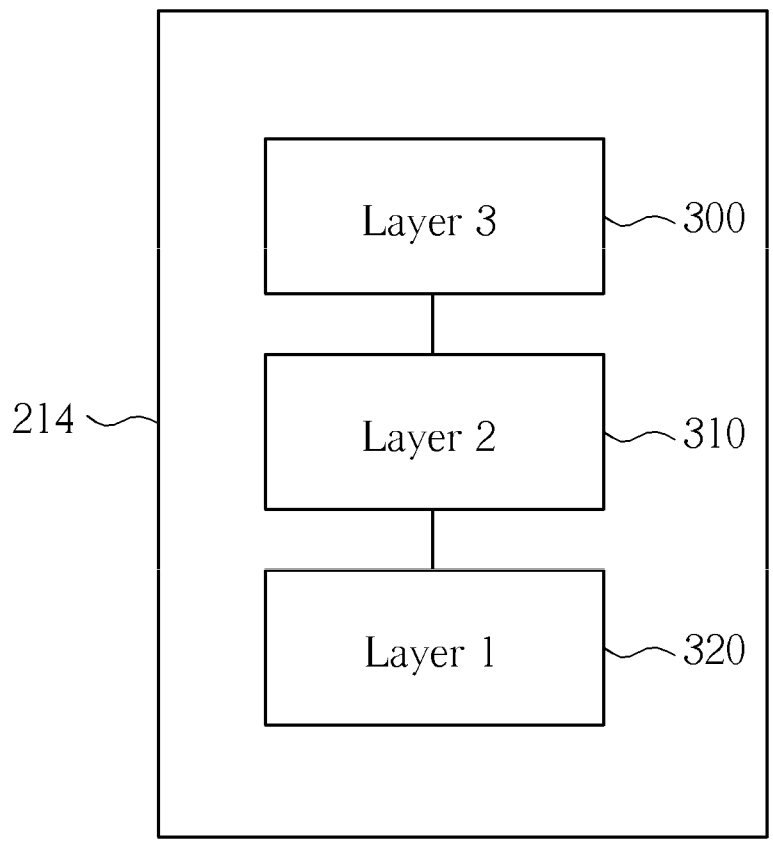
FIG. 3 is a schematic diagram of the program code of FIG. 2.

Please refer to FIG. 3, which illustrates a schematic diagram of the program code 214 according to an embodiment of the present invention. The program code 214 includes program code of multiple communications protocol layers, which from top to bottom are a layer 3 300, a layer 2 310, and a layer 1 320. The layer 3 300 is responsible for configuring the security keys according to information elements (IEs) and radio resource control (RRC) messages (or RR (Radio Resource) messages) received from the network. Various procedures are processed in the layer 3 300, such as an inter/intra-system handover and a RRC connection reestablishment procedure.

Figure 4:
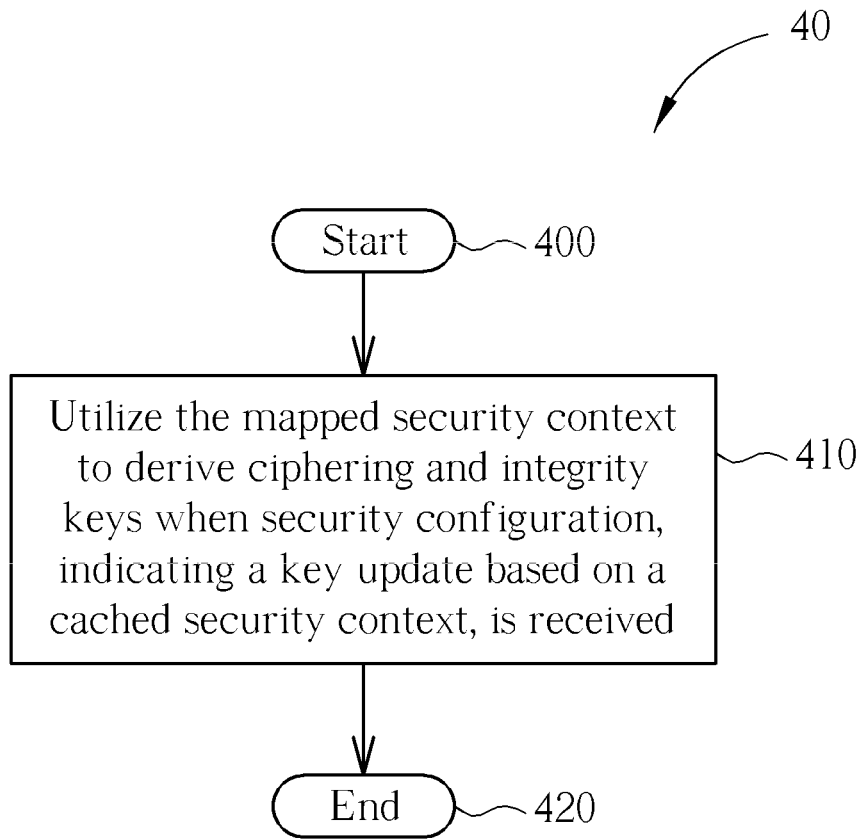
FIG. 4 is a flowchart of a process according to a first embodiment of the present invention.

Please refer to FIG. 4, which illustrates a flowchart of a process 40 according to a first embodiment of the present invention. The process 40 is utilized in a UE of the LTE system, using a mapped security context, for handling security configuration. The UE using the mapped security context means that the UE may just perform an inter-system handover and have not performed any LTE AKA procedure. In this embodiment, the network (e.g. MME) also has already used the mapped security context. The process 40 can be compiled into the program code 214 and includes the following steps:

Step 400: Start.

Step 410: Utilize the mapped security context to derive ciphering and integrity keys when security configuration, indicating a key update based on a cached security context, is received.

Step 420: End.

According to the process 40, the UE using the mapped security context also utilizes the mapped security context to derive the ciphering and integrity keys when receiving the security configuration indicating that the key update of the UE shall be performed based on the cached security context (e.g. $K_{ASME}$). In other words, the UE shall not follow the indication of the security configuration when using the mapped security context. With the process 40, the UE does not switch to use the cached security context because of the abovementioned security configuration and remains the same security base, i.e. the mapped security context, as the network. Therefore, data/signaling ciphering/integrity protection errors caused by incompatible ciphering and integrity keys between the UE and the network is avoided.

Furthermore, the ciphering and integrity key derivation can be achieved by deriving a mapped intermediate key from the mapped security context when the security configuration is received, deriving a base-station-level key from the mapped intermediate key, and using the base-station-level key to derive the ciphering and integrity keys. Preferably, the ciphering and integrity keys include a radio resource control integrity protection key, a radio resource control encryption key, and a user plane encryption key.

Take a first example where the security configuration is received via an intra-system handover after the inter-system handover. A UE performs an inter-system handover from the UMTS to the LTE system and thereby generates mapped security context that is converted from a security context derived from a UMTS AKA procedure. After the inter-system handover, the MME also uses the mapped security context. The UE then receives a handover command for an intra-LTE handover to a target eNB after the inter-system handover. During the intra-LTE handover, the MME uses a $K'_{ASME}$ to derive the $K_{eNB}$ and sends the $K_{eNB}$ to the target eNB. When a keyChangeIndicator IE value in the received handover command is set to FALSE, this indicates that the UE shall update the $K_{eNB}$ key based on the $K_{ASME}$ key to which the current $K_{eNB}$ is associated. According to the process 40, the UE derives a $K'_{ASME}$, same as the $K'_{ASME}$ of the MME, from the mapped security context, derives a $K_{eNB}$ from the $K'_{ASME}$, and uses the $K_{eNB}$ to derive keys $K_{RRCint}$, $K_{RRCenc}$, and $K_{UPenc}$. Therefore, the UE and the target eNB is able to use the same $K_{RRont}$ key for RRC signaling integrity protection, the same $K_{RRCenc}$ key for RRC signaling ciphering, and the same $K_{UPenc}$ key for user plane data ciphering after the intra-LTE handover.

Take a second example where the security configuration is received via an inter-system handover. A UE receives a handover command, including a keyChangeIndicator IE whose value is set to TRUE, for an inter-system handover to the LTE system. The keyChangeIndicator IE set to TRUE indicates that the UE shall update the $K_{eNB}$ key based on the latest available $K_{ASME}$ key. During the inter-system handover, the UE and the MME both generate mapped security context. According to the process 40, the UE does not follow the indication of the keyChangeIndicator IE and uses the mapped security context to derive the $K_{RRCint}$, $K_{RRCenc}$, and $K_{UPenc}$ keys for security activation. Therefore, the UE is able to accurately react to the security configuration received during the inter-system handover to avoid data/signaling ciphering/integrity protection errors.

Take a third example where the security configuration is associated with a RRC connection re-establishment procedure. A UE receives a handover command for an inter-system handover to the LTE system. During the inter-system handover, the UE and the MME both generate mapped security context. In addition, the UE encounters a radio link failure after successfully completing a random access procedure for uplink synchronization and RRC connection establishment with the EUTRAN. In this situation, the UE performs a RRC connection re-establishment procedure to recover the radio link failure. According to the process 40, the UE uses the mapped security context to derive ciphering and integrity keys for security activation after the radio link recovery when receiving an RRCConnectionReestablishment message.

Figure 5:
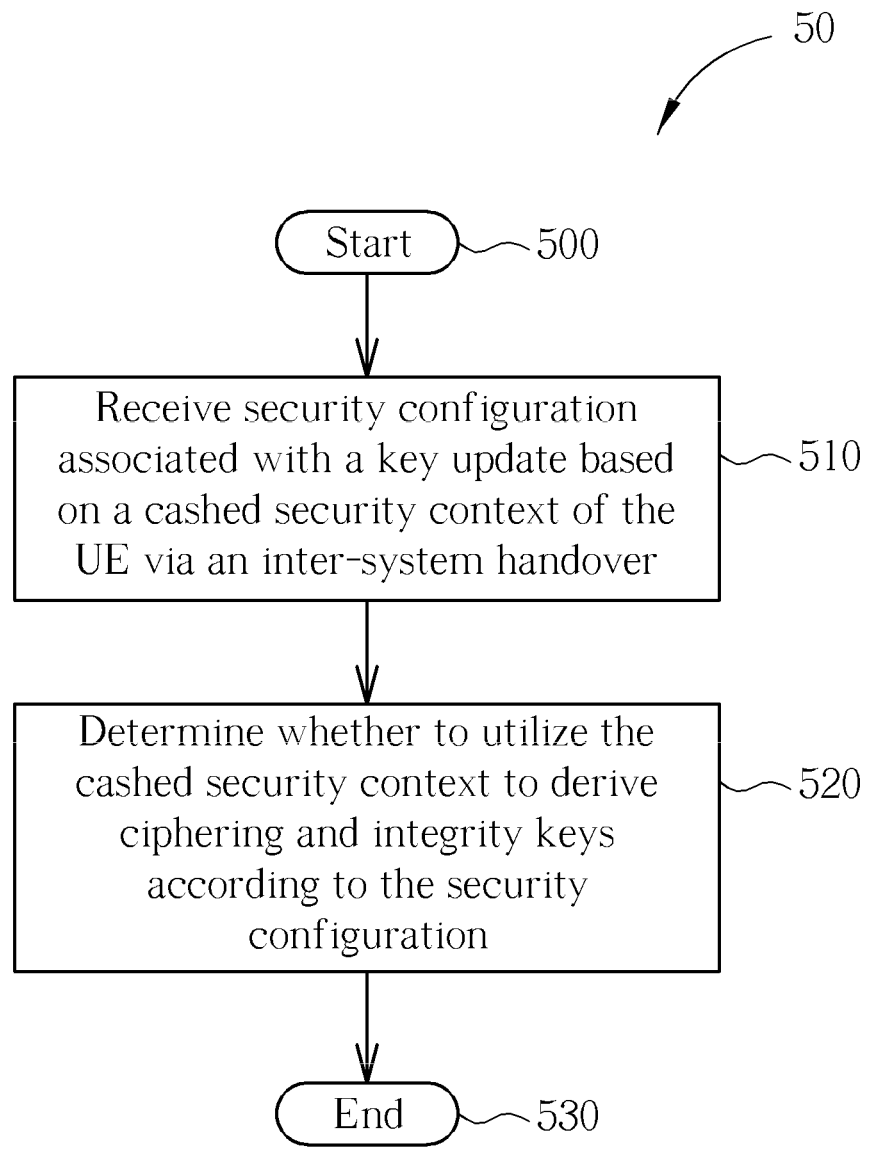
FIG. 5 is a flowchart of a process according to a second embodiment of the present invention.

Please refer to FIG. 5, which illustrates a flowchart of a process 50 according to a second embodiment of the present invention. The process 50 is utilized in a UE for handling security configuration. The process 50 can be compiled into the program code 214 and includes the following steps:

Step 500: Start.

Step 510: Receive security configuration associated with a key update based on a cashed security context of the UE via an inter-system handover.

Step 520: Determine whether to utilize the cashed security context to derive ciphering and integrity keys according to the security configuration.

Step 530: End.

According to the process 50, the UE performs the inter-system handover and receives corresponding security configuration associated with the key update. According to the security configuration content, the UE determines whether to utilize a cashed security context to derive the ciphering and integrity keys.

For an inter-system handover from a source network to the LTE network, the LTE network and the UE generate the same mapped security context. The LTE network may use the mapped security context after the inter-system handover. In this situation, the UE determines not to utilize the cashed security context and regards that the inter-system handover is invalid when the received security configuration indicates that a base-station-level key shall be updated based on the latest available cashed intermediate key. After this, the UE can further send a handover failure message to the source network.

On the other hand, the LTE network may use the cached security context instead of the generated mapped security context after the inter-system handover. In this situation, the UE determines to utilize the cashed security context to derive the ciphering and integrity keys when the received security configuration indicates that the base-station-level key shall be updated based on the latest available cashed intermediate key. Then, the UE derives a base-station-level key (e.g. $K_{eNB}$) from a cached intermediate key (e.g. $K_{ASME}$) of the cashed security context and uses the base-station-level key to derive the ciphering and integrity keys.

Preferably, the foregoing received security configuration is a keyChangeIndicator IE that is set to TRUE, indicating that a $K_{eNB}$ key shall be updated based on the latest available $K_{ASME}$ key. Preferably, the ciphering and integrity keys include a radio resource control integrity protection key, a radio resource control encryption key, and a user plane encryption key.

Through the process 50, the UE is able to accurately react to the security configuration received during the inter-system handover, so as to avoid data/signaling ciphering/integrity protection errors.

Figure 6:
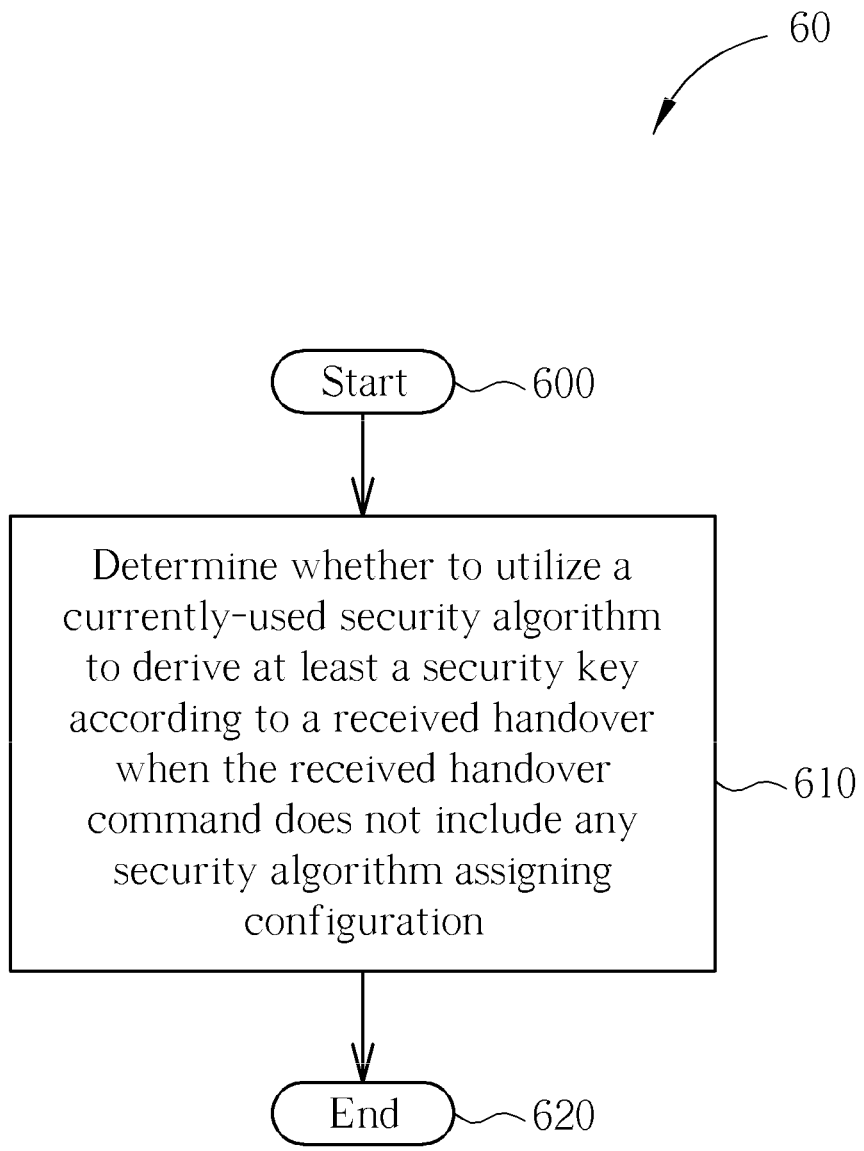
FIG. 6 is a flowchart of a process according to a third embodiment of the present invention.

Please refer to FIG. 6, which illustrates a flowchart of a process 60 according to a third embodiment of the present invention. The process 60 is utilized in a UE for handling security configuration. The process 60 can be compiled into the program code 214 and includes the following steps:

Step 600: Start.

Step 610: Determine whether to utilize a currently-used security algorithm to derive at least a security key according to a received handover when the received handover command does not include any security algorithm assigning configuration.

Step 620: End.

According to the process 60, the UE receives the handover command including no security algorithm assigning configuration to perform an inter-system or intra-system handover and then determines whether to utilize a currently-used security algorithm to derive at least a security key according to the received handover command. On the other hand, the UE utilizes a security algorithm assigned by security algorithm assigning configuration to derive the security key when the received handover command includes the security algorithm assigning configuration.

The UE determines not to utilize the currently-used security algorithm and regards that the handover command is invalid when the received handover command is received via a 2G wireless communication system. After this, the UE can further send a handover failure message to a source system or source base station. Otherwise, the UE determines to utilize the currently-used security algorithm to derive the security key when the handover command is received via a wireless communication system other than the 2G wireless communication system.

The security algorithm can be used for a security function, such as integrity protection or ciphering. Take an example based on the concept of the process 60. A UE receives a handover command for an inter RAT handover to the LTE system from a non-2G system. If an integrityProtAlgorithm IE is included in the received handover command, the UE and the LTE network derive the $K_{RRCint}$ key associated with the integrityProtAlgorithm. If the integrityProtAlgorithm is not included in the handover command, the UE and the LTE network derive the $K_{RRCint}$ key associated with the currently-used integrity algorithm. If a cipheringAlgorithm IE is included in the handover command, the UE and the LTE network derive the $K_{RRCenc}$ key and the $K_{UPenc}$ key associated with the cipheringAlgorithm. If the cipheringAlgorithm is not included in the handover command, the UE and the LTE network derive the $K_{RRCenc}$ key and the $K_{UPenc}$ key associated with the currently-used ciphering algorithm. However, the UE regards that the handover command includes invalid configuration if the handover command is received in a GERAN and the integrityProtAlgorithm or the cipheringAlgorithm IE is not included in the handover command. In this situation, the UE then sends a handover failure message to the GERAN. Therefore, the UE is able to accurately handle the handover command that does not include the optional integrityProtAlgorithm/cipheringAlgorithm IE, so as to avoid different use of integrity protection/ciphering algorithm between the UE and the network.

In conclusion, the embodiments of the present invention can prevent the UE and the network from using different security keys or algorithms for integrity protection and ciphering so as to avoid transmission failure after a handover or a RRC procedure failure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling security configuration for a mobile device in a wireless communication system during an intra-long term evolution (LTE) handover or a radio resource control (RRC) connection re-establishment procedure, after an inter-system handover from universal mobile telecommunications system (UMTS) to LTE, the method comprising:
utilizing a mapped security context generated in response to the inter-system handover to derive ciphering and integrity keys when security configuration is received via the intra-LTE handover or when a RRCConnectionReestablishment message is received during the RRC connection re-establishment procedure;
wherein the security configuration comprises a keyChangeIndicator information element set to a FALSE value and is included in a handover command for the intra-LTE handover.

2. The method of claim 1, wherein the utilizing step comprises:
deriving a base-station-level key from the mapped intermediate key; and
using the base-station-level key to derive the ciphering and integrity keys.

3. The method of claim 1, wherein the ciphering and integrity keys comprise a radio resource control integrity protection key, a radio resource control encryption key, and a user plane encryption key.

4. A communication device of a wireless communication system for accurately handling security configuration during an intra-long term evolution (LTE) handover or a radio resource control (RRC) connection re-establishment procedure, after an inter-system handover from universal mobile telecommunications system (UMTS) to LTE, the communication device comprising:
a computer readable recording medium for storing mapped security context, cached security context, and program code corresponding to a process, wherein the mapped security context is generated in response to the inter-system handover; and
a processor coupled to the computer readable recording medium, for processing the program code to execute the process;
wherein the process comprises:
utilizing the mapped security context to derive ciphering and integrity keys when the mapped security context is in use and when security configuration is received via the intra-LTE handover or a RRCConnectionReestablishment message is received during the RRC connection re-establishment procedure;
wherein the security configuration comprises a keyChangeIndicator information element set to a FALSE value and is included in a handover command for the intra-LTE handover.

5. The communication device of claim 4, wherein utilizing the mapped security context to derive the ciphering and integrity keys comprises:
deriving a base-station-level key from the mapped intermediate key; and
using the base-station-level key to derive the ciphering and integrity keys.

6. The communication device of claim 4, wherein the ciphering and integrity keys comprise a radio resource control integrity protection key, a radio resource control encryption key, and a user plane encryption key.

* * * * *